US012780037B1

(12) United States Patent
Anschuetz et al.

(10) Patent No.: US 12,780,037 B1
(45) Date of Patent: Nov. 3, 2026

(54) POWER MANAGEMENT SYSTEMS AND METHODS FOR MARINE VESSEL BATTERIES ACCORDING TO ENVIRONMENTAL CONDITIONS

(71) Applicant: Brunswick Corporation, Mettawa, IL (US)

(72) Inventors: Steven M. Anschuetz, Fond du Lac, WI (US); Bruce Bultman, Zeeland, MI (US)

(73) Assignee: Brunswick Corporation, Mettawa, IL (US)

( * ) Notice: Subject to any disclaimer, the term of this patent is extended or adjusted under 35 U.S.C. 154(b) by 258 days.

(21) Appl. No.: 18/119,647

(22) Filed: Mar. 9, 2023

(51) Int. Cl.
*B60L 58/13* (2019.01)

(52) U.S. Cl.
CPC ........... *B60L 58/13* (2019.02); *B60L 2200/32* (2013.01); *B60L 2240/622* (2013.01); *B60L 2240/667* (2013.01); *B60L 2250/00* (2013.01)

(58) Field of Classification Search
None
See application file for complete search history.

(56) References Cited

U.S. PATENT DOCUMENTS

| | | | | |
|---|---|---|---|---|
| 8,773,066 | B2 | 7/2014 | Kelty | |
| 8,907,629 | B2 | 12/2014 | Kelty et al. | |
| 8,994,562 | B1 | 3/2015 | Daniel et al. | |
| 10,336,213 | B2 * | 7/2019 | Geuß | B60W 30/18127 |
| 10,992,155 | B2 | 4/2021 | Shih et al. | |
| 11,050,287 | B2 | 6/2021 | Zhang et al. | |
| 11,358,584 | B2 | 6/2022 | Assaliyski et al. | |
| 11,518,261 | B2 | 12/2022 | Gonring | |
| 2017/0087996 | A1 * | 3/2017 | Lin | B60L 53/00 |
| 2022/0140627 | A1 | 5/2022 | Wang et al. | |
| 2023/0311700 | A1 * | 10/2023 | Shin | B60L 53/66 320/109 |
| 2024/0025265 | A1 * | 1/2024 | Wagner | B60L 7/22 |
| 2024/0118688 | A1 * | 4/2024 | Sakurada | G01C 21/3469 |
| 2024/0123862 | A1 * | 4/2024 | Soderborg | B60L 3/0046 |
| 2024/0140258 | A1 * | 5/2024 | Peppelaar | B60L 53/68 |
| 2024/0208484 | A1 * | 6/2024 | Sasaki | B60W 20/12 |

FOREIGN PATENT DOCUMENTS

| | | |
|---|---|---|
| WO | 2022169848 | 8/2022 |

OTHER PUBLICATIONS

Kalnins, Jared D., Unpublished U.S. Appl. No. 17/695,200, titled “Electric Marine Propulsion System and Control Method”, filed Mar. 15, 2022.

* cited by examiner

*Primary Examiner* — Lail A Kleinman
(74) *Attorney, Agent, or Firm* — Andrus Intellectual Property Law, LLP

(57) ABSTRACT

A power management system for a marine vessel is provided. The power storage system includes at least one marine battery configured to power a load on the marine vessel and a control system. The control system is configured to identify a vessel location, identify an environmental condition based on the vessel location, and determine a target state of charge for the at least one marine battery. The target state of charge is an optimized charge level for storing the at least one marine battery based on the environmental condition. The control system is further configured to compare a current state of charge of the at least one marine battery to the target state of charge, and generate a battery storage optimization action for the at least one marine battery based on the comparison.

20 Claims, 6 Drawing Sheets

600

602 604 606

| TEMPERATURE (°C) | SOC (%) | DURATION (WEEKS) |
|---|---|---|
| -40 | 30 | 52 |
| | 90 | 13 |
| 0 | 30 | 52 |
| | 90 | 13 |
| 40 | 30 | 20 |
| | 90 | 4 |
| 55 | 30 | 2 |
| | 90 | 1 |

FIG. 6

POWER MANAGEMENT SYSTEMS AND METHODS FOR MARINE VESSEL BATTERIES ACCORDING TO ENVIRONMENTAL CONDITIONS

FIELD

The present disclosure relates to power management systems and methods for marine electrical energy storage devices, namely batteries, and more particularly to systems and methods for adapting the storage parameters of marine batteries based on environmental conditions.

BACKGROUND

The following U.S. Patent provides background information and is incorporated herein by reference, in entirety.

U.S. Pat. No. 11,518,261 is directed to a fast charging station for a marine vessel battery on a marine vessel. The fast charging station includes a dock battery, a charger that is operatively coupled to a power source and the dock battery, and an enclosure located on a dock structure in a body of water. The enclosure is configured to encapsulate the dock battery and the charger. The charger is configured to charge the dock battery using the power source when the marine vessel is not docked to the dock structure. The charger is further configured to charge the marine vessel battery using the power source and the dock battery when the marine vessel is docked to the dock structure.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

According to one implementation of the present disclosure, a power management system for a marine vessel is provided. The power storage system includes at least one marine battery configured to power a load on the marine vessel, and a control system. The control system is configured to identify a vessel location, identify an environmental condition based on the vessel location, and determine a target state of charge for at least one marine battery. The target state of charge is an optimized charge level for storing at least one marine battery based on the environmental condition. The control system is further configured to compare a current state of charge of at least one marine battery to the target state of charge, and generate a battery storage optimization action for at least one marine battery based on the comparison.

According to another implementation of the present disclosure, a method for controlling a power storage system having at least one marine battery configured to power a load on a marine vessel is provided. The method includes identifying a vessel location, identifying an environmental condition based on the vessel location, and determining a target state of charge for at least one marine battery. The target state of charge is an optimized charge level for storing at least one marine battery based on the environmental condition. The method further includes comparing a current state of charge of at least one marine battery to the target state of charge; and generating a battery storage optimization action for at least one marine battery based on the comparison.

BRIEF DESCRIPTION OF DRAWINGS

Examples of systems and methods for optimizing a marine vessel are described with reference to the following Figures. The same numbers are used throughout the Figures to reference like features and like components.

FIGS. 5 and 6 are diagrams illustrating the correlation between the ambient storage temperature, state of charge, and speed of degradation for the power storage system of FIGS. 1 and 2.

DETAILED DESCRIPTION OF DRAWINGS

The presence of batteries and other rechargeable power sources on marine vessels provides numerous benefits, including the reduced consumption of fossil fuels. However, the present inventors have recognized that rechargeable power sources require the consideration and performance of certain maintenance tasks distinct from fossil fuel-based systems to ensure that the operational lifespans of such rechargeable systems are not unduly shortened due to environmental conditions surrounding the marine vessel. High voltage lithium-ion batteries such as those used on marine vessels are often subjected to prolonged periods of storage when the marine vessel is not in use during winter or other off-season time. For example, if the marine vessel is located in a cold climate with a brief boating season, the vessel may be winterized and stored outside for nine months of the year or more. In warmer climates, the vessel may not need to be winterized if outdoor temperatures do not fall below freezing; however, the vessel may still be subjected to periods of inactivity. Warmer climates may also be subject to hazardous weather conditions (e.g., hurricanes) that could damage the marine vessel and its power systems. In order to preserve the capacity of the batteries during these periods of inactivity and minimize any risk of harm arising from damaged batteries, it is important to maintain each battery at an optimal state of charge (SOC) that is generally much lower (i.e., 30-50% of full capacity) than the SOC that many operators would otherwise maintain their batteries (i.e., 90% of full capacity or more).

Service manuals may provide guidance to an operator seeking to charge or discharge batteries to optimal SOC levels for storage, but such manuals cannot automatically take into account the specific environmental, geographic, and storage variables to which the marine vessel is subjected. Such service manuals also rely on the operator to implement the guidance. The present inventors have therefore recognized that an automated system that generates optimal SOC levels and operates systems on the marine vessel to implement those SOC levels would be useful. Although the present disclosure is generally directed to the maintenance of batteries on marine vessels, the systems and methods disclosed herein are equally applicable to rechargeable power sources located on other vehicles that are frequently operated and stored on a seasonal basis, including, but not limited to, recreational vehicles (RVs), motorhomes, and all-terrain vehicles (ATVs).

Figure 1:
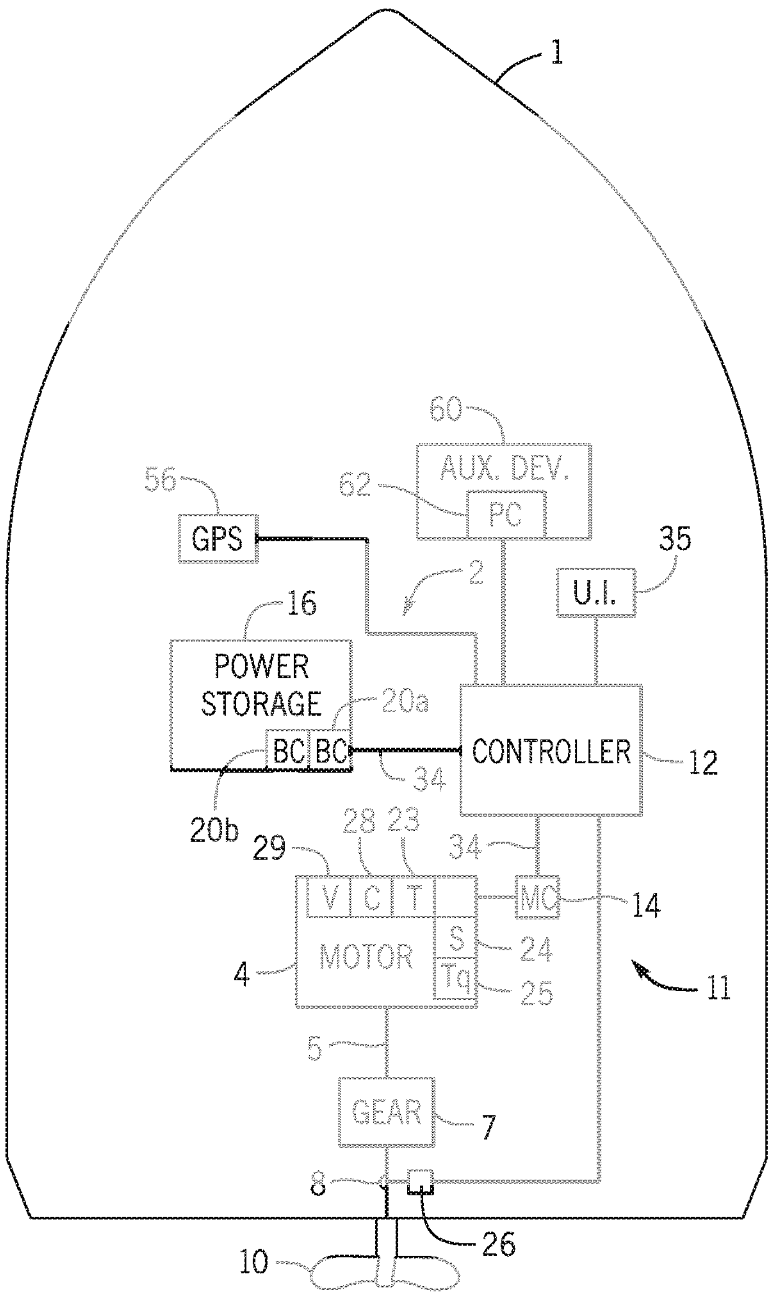
FIGS. 1 and 2 are schematic representations of a marine vessel having a power storage system according to an exemplary embodiment of the present disclosure.
Figure 2:
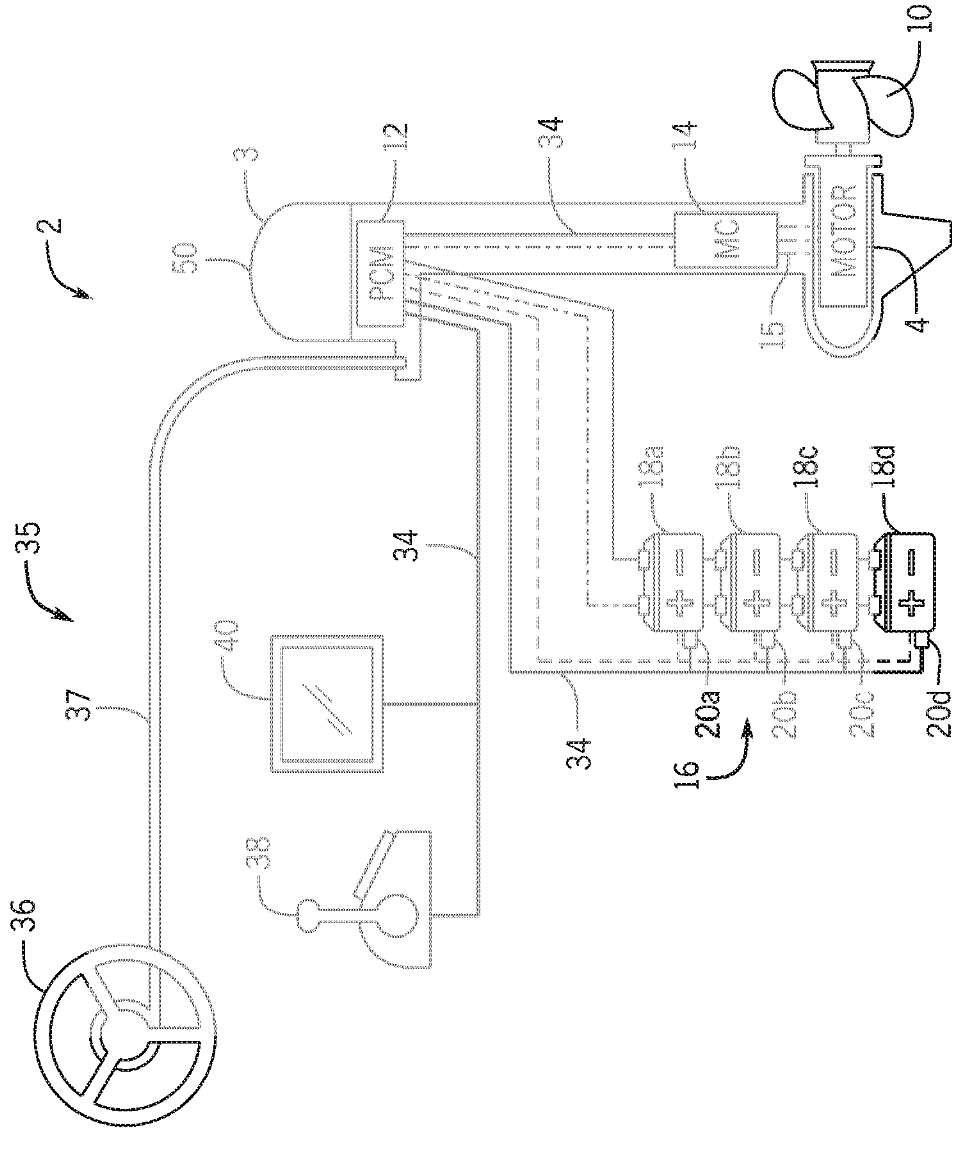

FIG. 1 depicts an exemplary embodiment of a marine vessel 1 having an electric marine propulsion system 2 configured to propel the marine vessel in a direction instructed by an operator via a steering control system, or by a guidance system configured to automatically control steering of the marine vessel to steer the vessel toward a predetermined location or global position. Referring also to FIG. 2, embodiments of the electric propulsion system 2 include at least one electric marine drive 3 having an electric motor 4 configured to propel the marine vessel 1 by rotating a propeller 10, as well as a power storage system 16, and a user interface system 35. In the depicted embodiment of FIG. 2, the electric marine propulsion system 2 includes an outboard marine drive 3 having an electric motor 4 housed therein, such as housed within the cowl 50 of the outboard marine drive. A person of ordinary skill in the art will understand in view of the present disclosure that the marine propulsion system 2 may include other types of electric marine drives 3, such as inboard drives or stern drives. The electric marine drive 3 is powered by the scalable storage device 16, such as including a plurality of batteries 18 connected in parallel.

The electric marine propulsion system 2 may include one or a plurality of electric marine drives 3, each comprising at least one electric motor 4 configured to rotate a propulsor, or propeller 10. The motor 4 may be, for example, a brushless electric motor, such as a brushless DC motor. In other embodiments, the electric motor may be a DC brushed motor, an AC brushless motor, a direct drive, a permanent magnet synchronous motor, an induction motor, or any other device that converts electric power to rotational motion. In certain embodiments, the electric motor 4 includes a rotor and a stator in a known configuration.

The electric motor 4 is electrically connected to and powered by a power storage system 16. The power storage system 16 stores energy for powering the electric motor 4 and is rechargeable, such as by connection to shore power when the electric motor 4 is not in use. Various power storage devices and systems are known in the relevant art. The power storage system 16 may be a battery system including a plurality of batteries 18 or banks of batteries. For example, the power storage system 16 may include a plurality of lithium-ion (LI) batteries 18, each LI battery 18 comprised of multiple battery cells. In other embodiments, the power storage system 16 may include a plurality of lead-acid batteries 18, flow batteries, ultracapacitors, and/or other rechargeable devices capable of storing and outputting electric energy.

Each battery 18*a*-18*d* may include an associated battery controller 20*a*-20*d* configured to identify a battery charge level and other battery parameters for that battery, such as battery temperature, and to determine a power limit for that battery based on the charge level (e.g., battery state of charge and/or battery voltage), battery temperature, battery state of health, etc. Further details regarding the determination of a charge level for a marine battery are found in U.S. patent application Ser. No. 17/695,200, incorporated by reference herein in its entirety. Each controller 20*a*-20*d* may also be configured to control whether the respective battery 18*a*-18*d* is connected to deliver power, and thus active, or is inactive and disconnected from and not delivering power to the marine drive(s) 3. For example, if the power limit for the battery 18*a*-18*d* is exceed, such as by a threshold amount or for a threshold period of time, then the controller 20*a*-20*c* may be configured to disconnect the battery 18*a*-18*d* in order to protect it from damage. Where a battery 18*a*-18*d* is in an inactive state, the respective controller 20*a*-20*d* may be configured to communicate a power limit of zero and/or to communicate an error indicating that the battery 18*a*-18*d* is not active or available to provide power.

The electric motor 4 is operably connected to the propeller 10 and configured to rotate the propeller 10. As will be known to the ordinary skilled person in the relevant art, the propeller 10 may include one or more propellers, impellers, or other propulsor devices and that the term "propeller" may be used to refer to all such devices. In certain embodiments, such as that represented in FIG. 1, the electric motor 4 may be connected and configured to rotate the propeller 10 through a gear system 7 or a transmission. In such an embodiment, the gear system 7 translates rotation of the motor output shaft 5 to the propeller shaft 8 to adjust conversion of the rotation and/or to disconnect the propeller shaft 8 from the drive shaft 5, as is sometimes referred to in the art as a "neutral" position where rotation of the drive shaft 5 is not translated to the propeller shaft 8. Various gear systems 7, or transmissions, are well known in the relevant art. In other embodiments, the electric motor 4 may directly connect to the propeller shaft 8 such that rotation of the drive shaft 5 is directly transmitted to the propeller shaft 8 at a constant and fixed ratio.

The power storage system 16 may further include a battery controller 20*a*-20*d* for each battery 18*a*-18*d* in the system, each battery controller 20*a*-20*d* configured to monitor and/or control the respective battery. The battery controller 20*a*-20*d* is configured to receive information from current, voltage, and/or other sensors within the respective battery 18*a*-18*d*, such as to receive information about the voltage, current, and temperature of each battery cell or group of battery cells. For example, the battery controller 20*a*-20*d* may receive inputs from one or more sensors, such as one or more voltage, current, and temperature sensors within a housing for the battery 18*a*-18*d*. Voltage sensors may be configured to sense voltage within the battery (such as cell voltage sensors configured to sense the voltage of individual cells or groups of cells in a LI battery) and one or more temperature sensors may be configured to sense a temperature within a housing. The battery controller 20*a*-20*d* is configured to calculate a charge level, such as a state of charge and/or a voltage (such as an open circuit voltage), of the battery 18*a*-18*d*, and may also be configured to determine a battery state of health and a current temperature for the battery 18*a*-18*d*. The battery controller 20*a*-20*d* may be further configured to determine a power limit for the battery 18*a*-18*d*, which is an amount of power that the battery 18*a*-18*d* can supply without overheating, over discharging, or otherwise compromising the battery. The battery controllers 20*a*-20*d* may be configured to communicate those values via a communication link 34 to other control devices in a control system 11.

A control system 11 controls the electric marine propulsion system 2, wherein the control system 11 may include a plurality of control devices configured to cooperate to provide the method of controlling the electric marine propulsion system described herein. For example, the control system 11 includes a central controller 12, a plurality of battery controllers 20*a*-20*d*, and one or more motor controllers 14, trim controllers, steering controllers, etc. communicatively connected, such as by a communication bus. A person of ordinary skill in the art will understand in view of the present disclosure that other control arrangements could be implemented and are within the scope of the present disclosure, and that the control functions described herein may be combined into a single controller or divided into any number of a plurality of distributed controllers that are communicatively connected.

Each controller may comprise a processor and a storage device, or memory, configured to store software and/or data utilized for controlling and or tracking operation of the electric propulsion system 2. The memory may include volatile and/or non-volatile systems and may include removable and/or non-removable media implemented in any method or technology for storage of information. The storage media may include non-transitory and/or transitory storage media, including random access memory, read only memory, or any other medium which can be used to store information and be accessed by an instruction execution system, for example. An input/output (I/O) system provides communication between the control system 11 and peripheral devices.

Each electric motor 4 may be associated with a motor controller 14 configured to control power to the electric motor, such as to the stator winding thereof. The motor controller 14 is configured to control the function and output of the electric motor 4, such as controlling the torque outputted by the motor, the rotational speed of the motor 4, as well as the input current, voltage, and power supplied to and utilized by the motor 4. In one arrangement, the motor controller 14 controls the current delivered to the stator windings via the leads 15, which input electrical energy to the electric motor to induce and control rotation of the rotor.

In certain embodiments, various sensing devices (e.g., motor temperature sensor 23, motor speed sensor 24, motor torque sensor 25, propeller speed sensor 26, motor current sensor 28, and motor voltage sensor 29), may be configured to communicate with a local controller, such as the motor controller 14 or battery controller **20*a*-20*d*, and in other embodiments the sensors 23-25, 26, and 28-29 may communicate with the central controller 12 and one or more of the motor controller 14 and or battery controller 20*a*-20*d* may be eliminated. A GPS system 55 may also be configured to determine a current global position of the vessel, track vessel position over time, and/or determine vessel speed and direction of travel, and to provide such information to the controller 12. Alternatively or additionally, vessel speed may be measured by a speed-over-water sensor such as a pitot tube or a paddle wheel and such information may be provided to the controller 12. Controllers 12, 14, 20*a*-20*d* (and or the various sensors and systems) may be configured to communicate via a communication bus such as a CAN bus or a LIN bus, or by single dedicated communication links between controllers 12, 14, 20*a*-20*d***.

The central controller 12, which in the embodiment shown in FIG. 2 is a propulsion control module (PCM), communicates with the motor controller 14 via communication link 34, such a serial communication bus or other type of communication network (which may be a wired or wireless network implementation). To provide one example, the communication link 34 may be a CAN bus, such as a Kingdom Network. The controller also receives input from and/or communicates with one or more user interface devices in the user interface system 35 via the communication link, which in some embodiments may be the same communication link as utilized for communication between the controllers 12, 14, **20*a*-20*d* or may be a separate communication link. The user interface devices in the exemplary embodiment include a throttle lever 38 and a display 40. In various embodiments, the display 40 may be, for example, part of an onboard management system, such as the VesselView® by Mercury Marine of Fond du Lac, Wisconsin. As described in further detail below, in some embodiments, messages and operator inputs that would otherwise be displayed on and/or received by the display 40 may instead be displayed on and received at an operator's mobile device or another display (e.g., a display located at a marina, storage center, or service center) that is remote from the marine vessel 1. Such displays that are remote from the marine vessel 1** may be configured to run the VesselView Mobile® application by Mercury Marine of Fond du Lac, Wisconsin.

Returning to FIG. 2, a steering wheel 36 is also shown to be provided, which in some embodiments may also communicate with the controller 12 in order to effectuate steering control over the marine drive 3, which is well-known and typically referred to as steer-by-wire arrangements. In the depicted embodiment, the steering wheel 36 is a steer arrangement where the steering wheel 36 is connected to a steering actuator that steers the marine drive 3 by a steering cable 37. Other steering arrangements, such as various steer-by-wire arrangements, are well-known in the art and could alternatively be implemented.

The power storage system 16 may further be configured to power auxiliary devices 61 on the marine vessel 1 that are not part of the propulsion system 2. For example, the auxiliary devices may include a bilge pump, cabin lights, a stereo system or other entertainment devices on the vessel, a water heater, a refrigerator, an air conditioner or other climate/comfort control devices on the vessel, communication systems, navigation systems, or the like. Some or all of these accessory devices are sometimes referred to as a "house load" and may consume a substantial amount of battery power.

Figure 3:
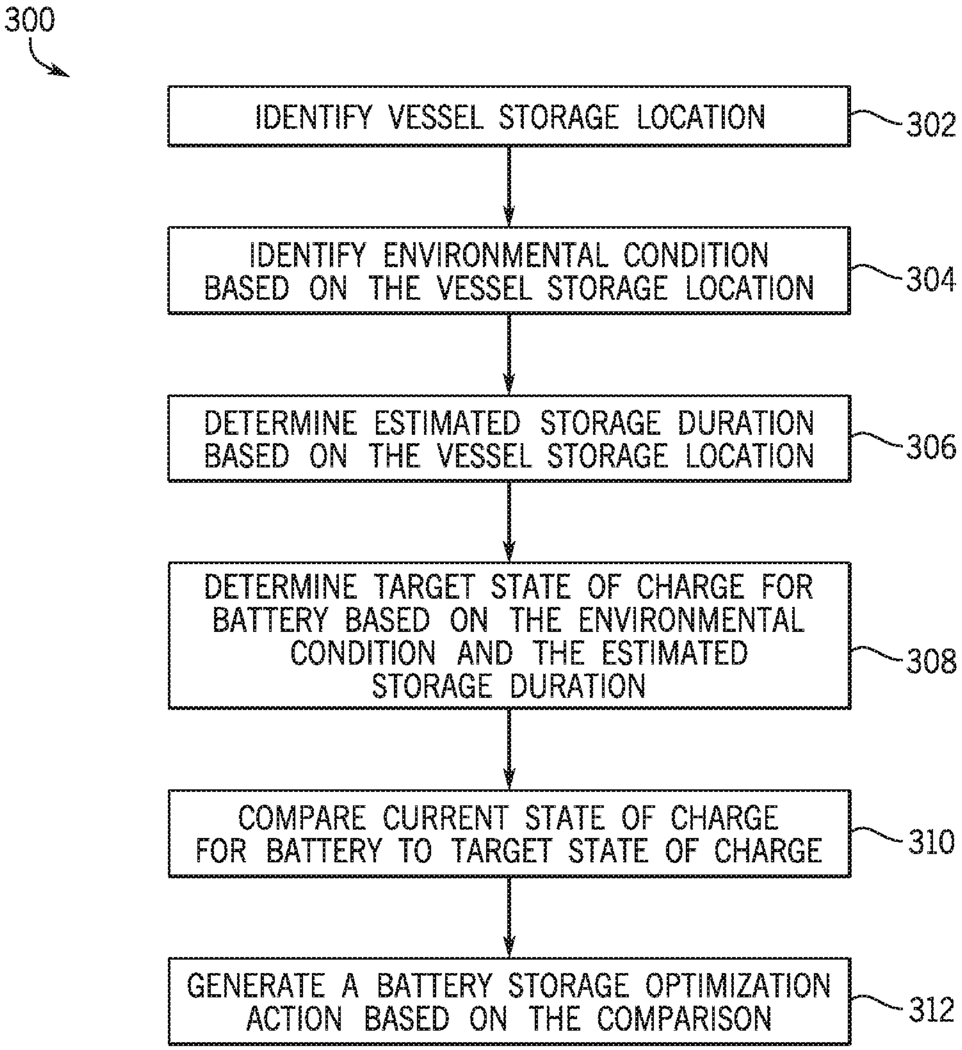
FIG. 3 illustrates an exemplary method for optimizing storage parameters for the power storage system of FIGS. 1 and 2.

Turning now to FIG. 3, a method 300 for optimizing the storage parameters of batteries **18*a*-18*d* of the power storage system 16 according to environmental conditions surrounding the marine vessel 1 is depicted. In an exemplary embodiment, method 300 is performed primarily by the central controller 12, although in other embodiments, one or more of the steps of method 300 may be performed by other components of the marine vessel 1. For example, the steps of method 300 may be performed by each of the battery controllers 20*a*-20*d* to determine an optimized SOC level for the batteries 18*a*-18*d* associated with the controllers 20*a*-20*d***.

Method 300 commences with step 302, in which the controller 12 identifies a storage location for the marine vessel 1. In various embodiments, the controller 12 may identify the storage location via automatic or manual methods. For example, in an exemplary embodiment, the controller 12 identifies the storage location automatically using data provided by the GPS system 55. In other embodiments, the controller 12 may receive the storage location via a manual operator input received at the user interface system 35 on the marine vessel 1, or via a device remote from the marine vessel 1 (e.g., an operator's mobile device, a service device located at a service center or storage location). In still further embodiments, the storage location may be identified using a combination of automated and manual methods. For example, the controller 12 may retrieve a previous storage location from memory and prompt the operator to confirm that the previous storage location will be utilized as a present or upcoming storage location.

At step 304, the controller 12 identifies at least one environmental condition based on the vessel storage location identified in step 302. In some embodiments, the environmental condition is an expected ambient storage temperature. At step 306, the controller 12 determines an estimated storage duration based on the vessel storage location identified in step 302. For example, if the GPS system 55 identifies the marine vessel 1 as located in southern Florida and the vessel history stored in memory of the controller 12 indicates that the marine vessel 1 has not been transported out of that location for any significant period of time, the controller 12 may determine that any expected storage period is likely to be only a few days or weeks, given that marine vessels in southern Florida are often utilized year-round. In certain embodiments, identifying the environmental condition is also based on a current date that is either automatically determined by the controller 12 or received as an input from the operator. For example, if the marine vessel 1 is identified to be located in northern Wisconsin and the current date is identified to be several days after a default winterization date, for example, Labor Day (i.e., the common conclusion of boating season in the northern U.S.), the controller 12 may identify that an extended storage period is likely to commence soon.

The type of marine vessel may also have an effect on the identified environmental conditions: certain types of boats (e.g., pontoon boats, ski/wake boats, runabout boats, open bow boats) may have shorter operational periods and therefore longer expected storage periods. In some cases, less expensive boats may also be less likely to be stored in temperature-controlled locations. Other types of boats (e.g., boats used in fishing applications) may be utilized for longer periods and stored for shorter periods in temperature-controlled locations.

Figure 4:
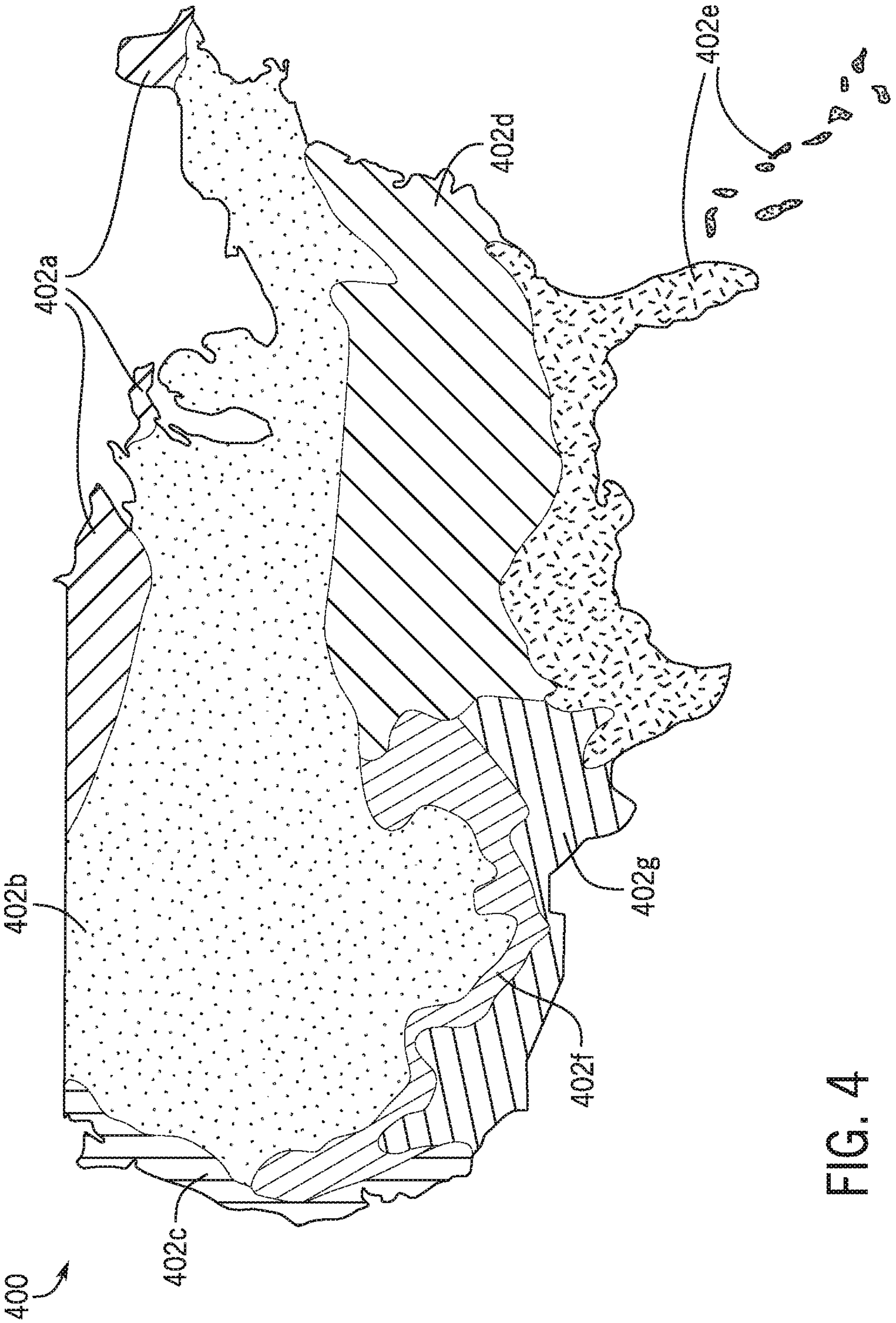
FIG. 4 is a diagram illustrating a sample geographical zone map that may be utilized to determine optimized storage parameters for the power storage system of FIGS. 1 and 2.

In further embodiments, identifying an environmental condition and determining an estimated storage duration based on the vessel storage location may include assigning the storage location to a geographical zone. FIG. 4 is an exemplary geographical zone map 400 that depicts the United States subdivided into a plurality of zones 402*a*-402*g*. Such geographical zone maps may be stored in memory of the controller 12. Each of the plurality of zones 402*a*-402*g* may be associated with expected average storage parameters (e.g., ambient storage temperature, storage period) that are generally common to each zone. For example, zones 402*a*-402*c* may generally have longer average storage periods and colder average storage temperatures than zones 402*d*-402*g*.

In still further embodiments, identifying an environmental condition based on the vessel storage location comprises identifying an upcoming weather event. For example, if the marine vessel 1 is located in the path of a forecasted hurricane that poses a risk of flooding, the controller 12 may identify that the marine vessel 1 will be subject to a storage period that would not otherwise occur but for the forecasted hurricane. In such a scenario, it may be particularly important to ensure that the batteries 18*a*-18*d* are discharged to a very low SOC level (i.e., 30% or less), because damage to the marine vessel 1 and flooding in the area surrounding the marine vessel 1 may result in an electrical hazard if the batteries 18*a*-18*d* remain at a high SOC level. In some embodiments, an identified storage location and identified date may affect how often the controller 12 communicates (e.g., via a wireless communications network) with a weather forecasting service or application. For example, marine vessels identified as located within zone 402*e* (see FIG. 4) are at a higher risk of damage due to hurricanes than vessels identified as located within zone 402*d*. Therefore, marine vessels within zone 402*e* may be configured to access weather forecasts more frequently (particularly if the identified date is within hurricane season), than marine vessels within zone 402*d*.

Returning to FIG. 3, at step 308, the controller 12 determines a target SOC level for the batteries 18*a*-18*d* based on the at least one environmental condition identified in step 304 and the estimated storage duration identified in step 306. The target SOC for a particular battery may depend on various parameters, including the type of cell format utilized in the battery (e.g., cylindrical, prismatic, or pouch cells), the chemical makeup of the battery cell, the length of the storage period and the temperature of the storage location. Accordingly, the controller 12 may prompt an operator to confirm a storage building condition for the marine vessel 1 via the display 40 or at the operator's mobile device. For example, the controller 12 may prompt an operator to confirm whether the storage building will be temperature controlled, and if known, to input a value or range for the controlled temperature.

Figure 5:
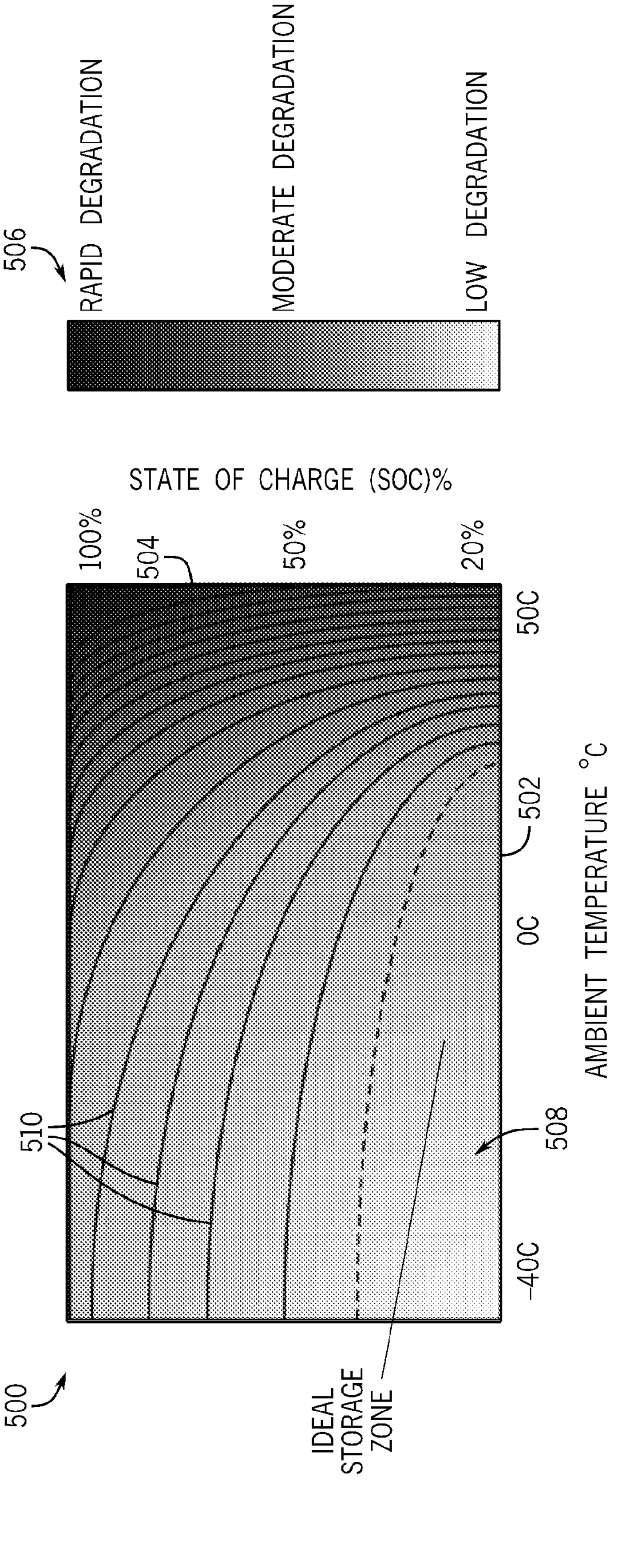

FIG. 5 depicts an exemplary plot 500 correlating ambient temperature, SOC level, and a relative amount of degradation to the battery that is experienced under such conditions for prolonged storage durations. "Prolonged storage" may refer to a storage period lasting a few weeks if the marine vessel is stored at a higher temperature (e.g., 35° C. or more) up to several months if the marine vessel is stored at a lower temperature (e.g., 25° C. or less). The controller 12 may store plots similar to plot 500 in memory and utilize such plots to determine the target SOC level at step 308 of method 300. Ambient temperature is represented on axis 502, while SOC level is represented on axis 504. As indicated by key 506, when a battery 18*a*-18*d* is stored at a high ambient temperature and a high SOC level, maximum battery degradation occurs which can significantly shorten the overall lifespan of the battery. Therefore, the target SOC level for the batteries 18*a*-18*d* determined by the controller 12 at step 308 will generally reside within the ideal storage zone 508. Each of the trendlines 510 depicted in FIG. 5 is representative of approximately equal battery degradation for prolonged storage. For example, storage of a battery at a 50% SOC and an ambient temperature of −40° C. is approximately equivalent to storage at a 20% of SOC and an ambient temperature of 25° C. This relationship is further shown in table 600 of FIG. 6, which depicts storage temperature in column 602, SOC in column 604, and storage duration in weeks in column 606. Each row in the table is representative of an approximately equal amount of battery degradation. Accordingly, storage of a battery at 0° C. ambient temperature and 30% SOC for an entire year represents the same amount of degradation to a battery as storage at 55° C. ambient temperature and 30% SOC for only 2 weeks.

As indicated by the relationships depicted in FIGS. 5 and 6, if the marine vessel 1 is stored at very low temperatures (i.e., less than 0° C.) as may be experienced in non-temperature-controlled storage locations within geographic zone 402*a* of map 400, the controller 12 may determine that the target SOC level may be slightly higher (e.g., 30-40%) than if the marine vessel 1 were stored at a higher temperature (i.e., more than 0° C.). In all cases, storing at a lower SOC level, so long as the SOC does not drop below a low SOC threshold, is better for the overall lifespan of the batteries 18*a*-18*d*. For example, depletion of a battery below a 10-15% SOC may result in voltage dropoff that requires recovery by a service tool.

Returning to FIG. 3 and method 300, at step 310 the controller 12 compares the target SOC level determined at step 308 with the present SOC level for each of the batteries 18*a*-18*d*. In an exemplary embodiment, the controller 12 may communicate with each of the battery controllers 20*a*-20*d* over communication link 34 to retrieve a present SOC level for each of the batteries 18*a*-18*d*. Method 300 concludes at step 312 as the controller 12 generates one or more battery storage optimization actions based on the comparison of the target SOC level and the current SOC level for each of the batteries 18*a*-18*d*. In an exemplary embodiment, the battery storage optimization action comprises the generation of an alert that is displayed on a display device either on the marine vessel 1 (e.g., display 40, see FIG. 2), or remote from the marine vessel 1 (e.g., an operator's mobile device or tablet, a service center tool). For example, if the controller 12 determines that a hurricane or a long stretch of extreme temperatures is approaching the location of the marine vessel 1 at step 304, the controller 12 may push a notification to the operator's mobile phone with the target SOC level, prompting the operator to take action to protect the power storage system 16.

In various embodiments, the alert may be able to be dismissed or delayed by an operator. For example, an operator who intends to utilize the marine vessel 1 for a period of time past an expected storage date may choose to "snooze" the battery storage optimization alert generated on the display 40 for a specified period of time (e.g., a few days, a week). In some embodiments, rather than a "splash screen" alert that interrupts the normal applications displayed on the display device, the battery storage optimization action may comprise a message with the target SOC level that is accessible on a separate tab or screen within the application so that the operator can retrieve and act upon the optimization information at the operator's discretion and convenience.

In an exemplary embodiment, the battery storage optimization action generated at step 312 comprises discharge of one or more of the batteries 18*a*-18*d* to reach an SOC level that is less than or equal to the target SOC level, so long as the discharge does not drop below a low SOC threshold (e.g., 10-15%). If one or more of the batteries 18*a*-18*d* is approaching the low SOC threshold, the battery storage optimization action may include charging one or more of the batteries 18*a*-18*d*. Discharge or charge of the batteries 18*a*-18*d* may be accomplished with varying degrees of interaction with the operator. In one embodiment, the discharge of batteries 18*a*-18*d* is fully automated by the controller 12 and is initiated upon a determination that there is a discrepancy between the target SOC level and the current SOC level at step 310 without any required input from the operator, although a notification message may be sent to the operator. In other embodiments, the controller 12 may require the operator to approve or initiate the discharge of batteries, for example, by pushing a "START" button that is included below an alert message displayed on the display 40 or the operator's mobile device informing the operator of the need to discharge the batteries to reach the target SOC level. In still further embodiments, the operator may discharge the batteries 18*a*-18*d* responsive to an instruction generated by the controller 12, but the discharge process is fully initiated and controlled by the operator rather than automated. The means of discharging the batteries 18*a*-18*d* at step 312 is not particularly limited and may be accomplished by operating any electrical load on the marine vessel 1 (e.g., heaters, pumps) that does not pose a hazard to the marine vessel 1 or persons around the marine vessel 1. For example, in an exemplary embodiment, discharge of the batteries 18*a*-18*d* may be accomplished by operating a cooling pump that is configured to prevent the batteries 18*a*-18*d* from exceeding a high temperature threshold. In other embodiments, an owner or service technician could operate the marine vessel 1 on water until the batteries 18*a*-18*d* reach the target SOC.

This written description uses examples to disclose the invention, including the best mode, and also to enable any person skilled in the art to make and use the invention. Certain terms have been used for brevity, clarity and understanding. No unnecessary limitations are to be inferred therefrom beyond the requirement of the prior art because such terms are used for descriptive purposes only and are intended to be broadly construed. The patentable scope of the invention is defined by the claims, and may include other examples that occur to those skilled in the art. Such other examples are intended to be within the scope of the claims if they have features or structural elements that do not differ from the literal language of the claims, or if they include equivalent features or structural elements with insubstantial differences from the literal languages of the claims.

What is claimed is:

1. A power management system for a marine vessel comprising:
- a power storage system comprising at least one marine battery configured to power a load on the marine vessel; and
- a control system configured to:
  - identify a vessel storage location;
  - identify an environmental condition at the vessel storage location;
  - determine a target state of charge for the at least one marine battery, wherein the target state of charge is an optimized charge level for storing the at least one marine battery at the vessel storage location based on the environmental condition at the vessel storage location;
  - compare a current state of charge of the at least one marine battery to the target state of charge; and
  - control the power storage system and/or the load to progress the current state of charge of the at least one marine battery towards the target state of charge.

2. The power management system of claim 1, wherein the vessel storage location is automatically identified using a global positioning system or manually identified via a user input.

3. The power management system of claim 1, wherein the environmental condition is further based on a current date.

4. The power management system of claim 1, wherein the control system is further configured to store at least one map defining a plurality of geographical zones; wherein each of the plurality of geographical zones has at least one associated environmental condition; and
- wherein identifying the environmental condition at the vessel storage location comprises assigning the marine vessel to one of the plurality of geographical zones.

5. The power management system of claim 1, wherein the environmental condition comprises at least one of a hurricane weather event and a flooding weather event.

6. The power management system of claim 1, wherein the target state of charge is further based on a storage building condition of a storage building of the marine vessel at the vessel storage location, and wherein the storage building condition comprises a temperature control status of the storage building.

7. The power management system of claim 1, wherein the control system is further configured to control a user interface on the marine vessel to generate an alert to notify an operator of the target state of charge.

8. The power management system of claim 7, wherein the alert is generated prior to controlling the power storage system and/or the load to progress the current state of charge of the at least one marine battery towards the target state of charge, and wherein the alert is further configured to permit the operator to accept or dismiss reduction of the current state of charge of the at least one marine battery to less than or equal to the target state of charge for the at least one marine battery.

9. The power management system of claim 7, wherein the alert is further configured to notify the operator of an autonomous action to reduce the current state of charge of the at least one marine battery to less than or equal to the target state of charge for the at least one marine battery.

10. The power management system of claim 1, wherein controlling the power storage system and/or the load to progress the current state of charge of the at least one marine battery towards the target state of charge comprises autonomously running the load on the marine vessel to reduce the current state of charge of the at least one marine battery to less than or equal to the target state of charge for the at least one marine battery.

11. A method for controlling a power storage system comprising at least one marine battery configured to power a load on a marine vessel, the method comprising:

identifying a vessel storage location;

identifying an environmental condition at the vessel storage location;

determining a target state of charge for the at least one marine battery, wherein the target state of charge is an optimized charge level for storing the at least one marine battery at the vessel storage location based on the environmental condition at the vessel storage location;

comparing a current state of charge of the at least one marine battery to the target state of charge; and controlling the power storage system and/or the load to progress the current state of charge of the at least one marine battery towards the target state of charge.

12. The method of claim 11, wherein the vessel storage location is identified using at least one of a global positioning system and a user input.

13. The method of claim 11, wherein the environmental condition is further based on a current date.

14. The method of claim 11, wherein the method further comprises:

storing at least one map defining a plurality of geographical zones, wherein each of the plurality of geographical zones has at least one associated environmental condition; and wherein identifying the environmental condition at the vessel storage location comprises assigning the marine vessel to one of the plurality of geographical zones.

15. The method of claim 11, wherein the environmental condition comprises at least one of a hurricane weather event and a flooding weather event.

16. The method of claim 11, wherein the target state of charge is further based on a storage building condition of a storage building of the marine vessel at the vessel storage location, and wherein the storage building condition comprises a temperature control status of the storage building.

17. The method of claim 11, wherein the method further comprises controlling a user interface on the marine vessel to generate an alert.

18. The method of claim 11, wherein controlling the power storage system and/or the load to progress the current state of charge of the at least one marine battery towards the target state of charge comprises autonomously running the load on the marine vessel to reduce the current state of charge of the at least one marine battery to less than or equal to the target state of charge for the at least one marine battery.

19. The power management system of claim 5, wherein the at least one associated environmental condition comprises an expected storage period for the marine vessel.

20. The power management system of claim 1, wherein the control system is further configured to:

retrieve a forecasted weather event from a weather forecasting service; and automatically modify the target state of charge responsive to the forecasted weather event.

* * * * *